(No Model.) 3 Sheets—Sheet 3.
G. A. WRIGHT.
MACHINE FOR DRAWING IN PERSPECTIVE.
No. 453,332. Patented June 2, 1891.
Fig. 7.
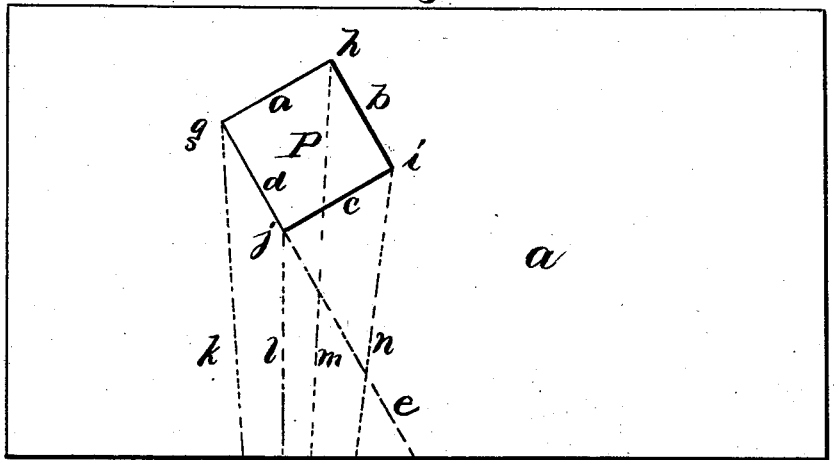
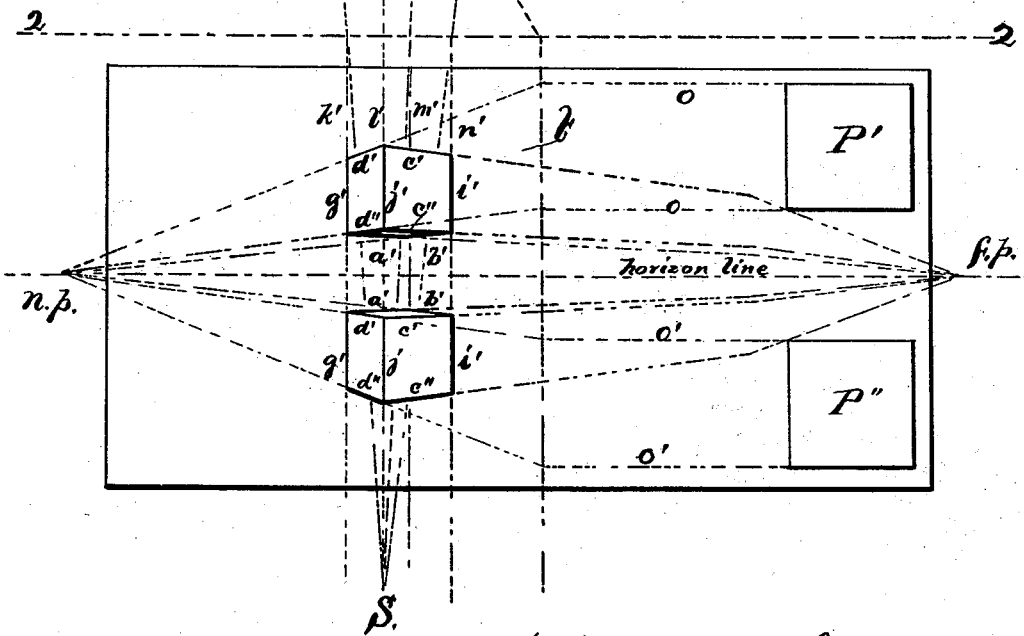
Witnesses  
H. A. Carhart  
C. B. Kinne
Gordon A. Wright — Inventor  
By his Attorneys  
Smith & Denison

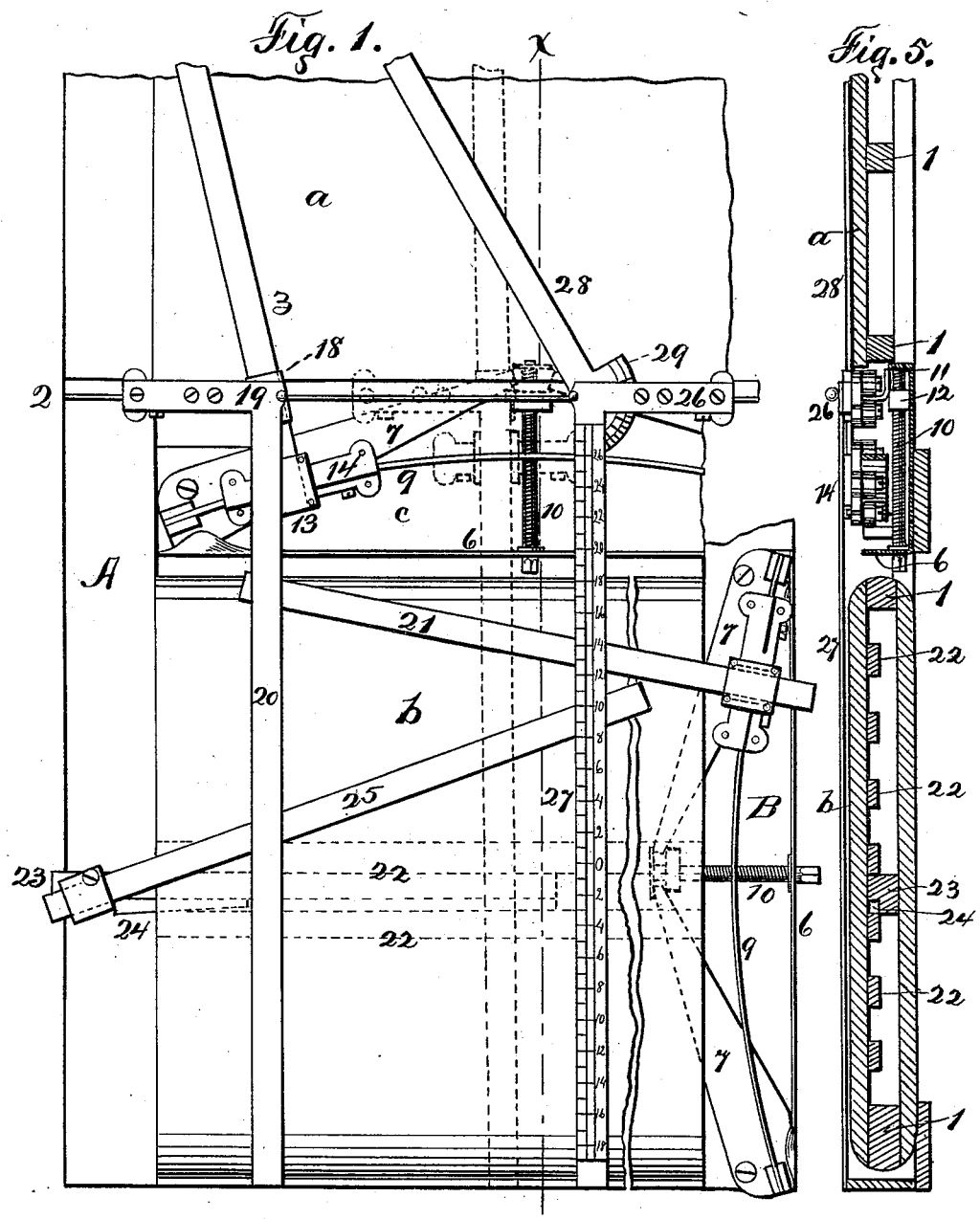

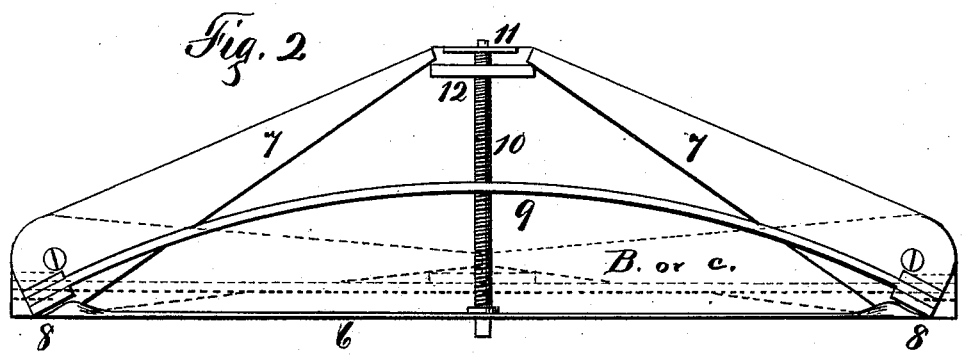
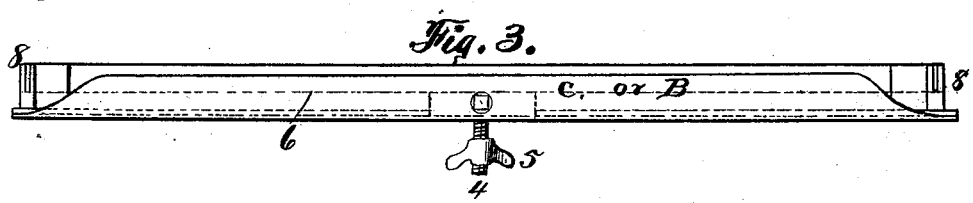
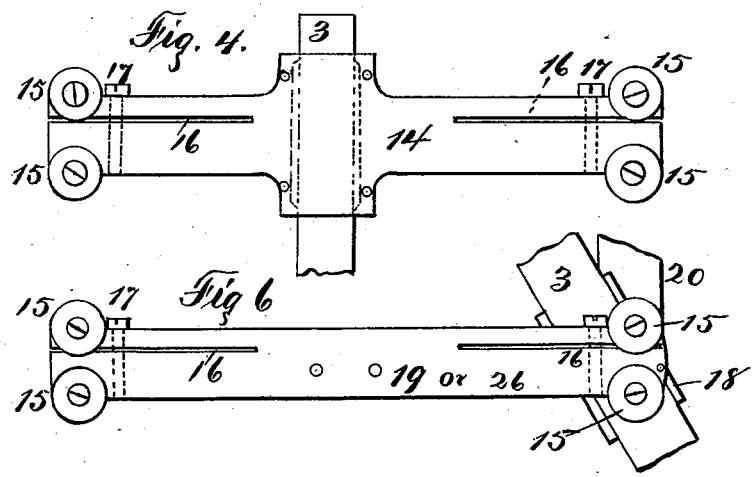

UNITED STATES PATENT OFFICE.

GORDON ALMOND WRIGHT, OF MASSENA, NEW YORK.

MACHINE FOR DRAWING IN PERSPECTIVE.

SPECIFICATION forming part of Letters Patent No. 453,332, dated June 2, 1891.

Application filed September 1, 1890. Serial No. 363,729. (No model.)

*To all whom it may concern:*

Be it known that I, GORDON ALMOND WRIGHT, a citizen of the United States, residing at Massena, in the county of St. Lawrence and State of New York, have invented a new and useful Apparatus for Drawing Perspectives, of which the following is a specification.

My invention relates to an apparatus for drawing perspectives from a plan or plane and an elevation or elevations of an object.

My object is to produce an improved machine whereby I can correct perspectives from the plans and elevations of an object, and in which I adjust the point of sight at any desired distance from the picture-plane line and the vanishing-points at any desired distance from the center of the picture plane by means of rules adjustable to any line of sight, by an adjustable rule from the point of sight, by an adjustable rule from the near vanishing-point, by an adjustable rule from the far vanishing-point, and project my perspectives with these in conjunction with an adjustable scale for the actual-height line, a vertical-line rule standing perpendicular to the picture-plane line, and a plan-angle rule, all mounted upon a drafting-board.

My invention consists in the several novel features of construction and operation hereinafter described, and which are specifically set forth in the claims hereunto annexed. It is constructed and operated as follows, reference being had to the accompanying drawings, in which—

Figure 1 is a top plan view. Fig. 2 is a top plan view of the mechanism to change the arc of the circle upon which the point-of-sight rule or upon which the rule to the far vanishing-point is mounted. Fig. 3 is an edge elevation of the mechanism shown in Fig. 2, and showing the set-screw by which it is mounted upon the board. Fig. 4 is a bottom plan view of the carriage used to carry the point-of-sight rule or far-vanishing-point rule upon the arc, to which said rule always stands at a right angle. Fig. 5 is a vertical longitudinal section on line X X in Fig. 1. Fig. 6 is a bottom plan view of the carriage upon which the vertical-line rule is mounted and of the pivotal connection thereto of the point-of-sight rule, by means of which the movement of the latter rule will carry the former rule along with it in such a manner that the vertical-line rule will always stand at a right angle to the picture-plane line at the point where it is crossed by the point-of-sight rule. Fig. 7 shows two perspectives drawn from the plan shown above them, and elevations at the side, also showing the picture-plane line and the horizon line, the lines to point of sight, and the vertical-height lines, the actual-height line, and the far and near vanishing-point lines, the lines being so drawn in this figure as to converge abruptly to the far vanishing-point in order to get said point upon the sheet instead of being continued according to the theory in regard thereto. This may affect the parallelism of these lines in the drawings, but is sufficient to illustrate the principles of my invention.

A is a drafting-board composed of two sections *a b*, raised above the supporting-base by transverse blocks 1 1 and leaving a space between the boards. For perspicuity I shall hereinafter call the section *a* the "plan-board" and the section *b* the "perspective-board," and the outer faces of these boards are substantially in the same horizontal plane.

Adjacent to the lower edge of the plan-board and parallel therewith I secure upon and vertical to the base a rib 2 straight across the base and longer than the width of the boards, and this rib is, in fact, the picture-plane line, and it also constitutes the track upon which the carriages traverse, as hereinafter explained.

In the space between the boards I secure upon the base the frame *c*, carrying the arc 9, which arc is also the trackway of the carriage carrying the inner end of the rule 3, which rule leads in the direction of and indicates the line to the point of sight, and by the movement of this rule I ascertain the point where the different point-of-sight lines intersect the picture-plane line. This arc frame *c* is secured to the base of the boards by a threaded pin 4 passing down through the base and the nut 5 thereon, Fig. 3. It consists of a plane body having flanges 6 and 11 along its edges and a spring-holder consisting of two arms 7, pivotally mounted upon the body and provided on their outer faces with parallel projecting studs 8, between which the ends of the arc spring 9 are secured, and 10 is a screw inserted through the flanges 6 and 11 and having bearings in these flanges below the plan-board and passing through a nut 12, and the inner ends of the arms 7 bear frictionally upon this nut, and the result is that when the nut is moved toward the flange 6 the curvature of the arc is reduced and its radius increases in length, and when the nut is moved away from said flange the curve of the arc is increased and its radius is shortened. The point of sight S is always the center of the circle of this arc. This point-of-sight rule 3 has its inner end secured removably in a mortise in the block 13 upon the carriage 14, which is provided on its under face with rollers 15, which bear against the sides of the arc spring, so that said arc is the trackway for the carriage. The body of this carriage has slits 16 in its ends on one side, and a transverse screw 17 operates to open or close each slit and regulate the tensional bearing of the rolls upon the arc and prevent slipping. A slide 18 fits over rule 3 and is pivotally connected to a carriage 19, mounted upon the picture-plane-line track 2, so that the movement of the rule 3 and its carriage 14 causes the carriage 19 to traverse its track. This latter carriage 19 has rollers bearing against the sides of the track the same as the carriage 14. To this carriage and at right angles thereto and to this picture-plane-line track I secure my vertical-line rule 20, which is always perpendicular to the picture-plane line.

B is another arc frame and carriage of the same construction as the frame $c$ and carriage 14, and in the block upon the carriage the far-vanishing-point rule 21 is mounted the same as the rule 3 on its carriage, and the arc spring is adjustable to any curve, according to the radial distance desired for the far vanishing-point $f p$.

In the space between the perspective-board $b$ and the base, by means of parallel transverse cleats, I create a series of parallel ways, one of which is shown by the dotted lines in Fig. 1 at 22, and which are parallel with the picture-plane line. In one of these ways I removably insert a bar 23, (shown as secured therein by a wedge 24,) and upon this I pivot the near-vanishing-point rule 25, the pivot $n p$ thereof representing such vanishing-point. I also mount a carriage 26 upon the picture-plane-line track, precisely like the carriage on the same line connected to the point-of-sight-line rule, except that it is reversed. To this carriage and at right angles thereto and perpendicular to the picture-plane line I secure my actual-height-line rule 27, which accordingly is parallel with the rule 20, and upon which I mount a scale, if desired. To this carriage I pivotally connect my plan-angle rule 28, provided with a quadrant-sector 29, scaled off with degrees, &c.

It will be seen that I can change the far and near vanishing-point rules 21 and 25 to opposite sides from that shown in the drawings, changing over the arc frame B, and also that I can change over the point-of-sight rule and the plan-angle rule 3 and 28 for lines at different angles from those shown in Fig. 1 by taking each from one carriage and putting it into the other and reversing the carriage 14, and then rule 20 will become the actual-height line and receive the scale and rule 27 will become the vertical-line rule.

It is operated as follows, reference being had to Fig. 7, especially, in which I show perspectives from a given plan P and the elevation P′ and P″, the plan being back of the picture-plane line and substantially on the center line from the point of sight, and the elevations being one above and one below the horizon line T. For illustrating the principle of my invention, I will describe the making of these perspectives. Having the position of the plan and elevation, I then, according to the rules of perspective, locate the point of sight and the vanishing-points and adjust the arcs 9 and B to curves having the proper radii. I set the plan-angle rule in line with the line $d$ of the plan, and the sector will show the angle of the departure of that line from a line perpendicular to the picture-plane line. I now move the rule 3 successively to the points $g$, $h$, and $j$ upon the plan, the dotted lines $k$, $l$, $m$, and $n$ indicating its several positions, and the rule 20 being moved therewith takes the positions shown by the dotted lines $k'$, $l'$, $m'$, and $n'$, all of which are perpendicular to the picture-plane line, and I know that the corners of the perspectives must be in these lines. I now move the plan-angle rule 28 to the corner $j$ of the plan, and the dotted line $e$ indicates its position and also shows the angle of the plan to the picture-plane line, and with the rule 28 in this position, dotted line $f$, which has the position of rule 27, is the actual-height line perpendicular to the picture-plane line, and I measure off thereon the actual height of the elevations P′ P″, as indicated by the dotted lines $o$ $o'$, parallel with the picture-plane line. Then with the near-vanishing-point rule 25 placed so as to align with the intersection of the lines $o$ with the $f$, I draw the lines $d'$ $d''$ between the verticals $k'$ $l'$, and with the rule 20 draw the vertical lines $g'$ $j'$ between the ends of the lines $d'$ $d''$ and upon said verticals. Then with the far-vanishing-point rule 21 I draw the lines $c'$ $c''$ from the ends of line $j$ to the vertical $n'$, and with the rule 20 draw the line $i'$ upon said vertical. Then with the far-vanishing-point rule 21 I draw the line $a'$ from the lower end of $g'$ to the vertical $m'$, and then with the near-vanishing-point rule 25 I draw the line $b'$ from the bottom of line $i'$ on vertical $n'$ to the line $m'$, where it will meet the line $a'$. This completes the upper perspective in Fig. 7, and the lower one is drawn by the same method of using the rules. For perspicuity I have dotted in the various lines extending to the point of vision and to the far and near vanishing-points. This illustrates one method of operating my device. I can also produce these same perspectives by first obtaining the lines $d'$, $d''$, $c'$, $c''$, and $a'\, b'$, as above described, and then with the rule 20 (or 27) draw the verticals $g'\, j'\, i'$ upon the verticals $k'\, l'\, n'$. It will be seen that in both the perspectives the lines $d'$, $d''$, and $b'$ are drawn on lines radiating from the near vanishing-point, and that the lines $c'\, c''\, a'$ are drawn on lines radiating from the far vanishing-point, and also that the lines $g'\, j'\, i'$ are all perpendicular to the picture-plane line. It will be seen, also, that by means of the arc of the frame $c$, bent to an arc with a radius equal in length to the distance from the point of sight, the arc becomes by substitution the actual point of sight, and that all lines drawn at right angles thereto, by rule 3 are actual lines of sight; also, in like manner when the arc frame B is on the left or right its arc is always curved on a radius from the far vanishing-point, and lines drawn by the rule 21 at right angles to said arc are the actual vanishing-lines from that point. It will be seen that the point-of-sight rule 3 is always at right angles to the carriage upon the trackway 9 and to the arc of the track, that the rule 20 is always perpendicular to the picture-plane-line track, that the rule 21 is always at right angles to its carriage and the arc of its track, that the rule 25 is adjustable along the edge of the drafting-board by removing the bar 23 and wedge 24 and inserting them into another space under the board, so as to bring the horizon line in different positions. It will also be seen that the arc frame B can be located upon either side of the drafting-board and on whichever side it is represents the far vanishing-point, and that on whichever side the rule 25 is placed it always indicates the near vanishing-point. It will be further seen that all of the wheeled carriages adjustably grip the trackways upon which they respectively travel, or that when by moving a carriage one of the rules is placed at the point desired I can tighten a screw and hold the carriage and rule from slipping, and that the carriages 19 and 26 are interchangeable in their position upon the picture-plane-line trackway.

What I claim as my invention, and desire to secure by Letters Patent, is—

1. The combination, with the picture-plane-line track, of the carriage thereon, the mounted rule at right angles thereto, and the rule pivotally connected to the carriage.

2. A variable arc frame comprising a base, converging arms pivoted thereon, a spring having its extremities mounted in said arms, a set-screw mounted upon said base, and a nut traversing said screw in engagement with said arms.

3. The combination, with a variable-arc frame consisting of a base, converging arms pivoted thereon, a spring-trackway having its extremities mounted in said arms, a set-screw mounted upon said base, and a nut traversing said screw in engagement with said arms, of a reversible carriage mounted upon and traversing said track, and a rule mounted upon said carriage.

4. The combination, with the variable-arc frame consisting of a base, converging arms pivoted thereon, a spring-trackway having its extremities mounted in said arms, a set-screw mounted upon said base, a nut traversing said screw in engagement with said arms, the carriage mounted upon and traversing said track, and the point-of-sight rule mounted upon said carriage, of the picture-plane-line track, the carriage traversing this track and pivotally connected to the point-of-sight rule, and the vertical-line rule carried by the latter carriage.

5. The combination, with the variable-arc trackway and means to vary the radius of the arc, of a reversible carriage mounted thereon, comprising a body and wheels on either side of the track, and means to vary the grip of the wheels upon the track.

6. The combination, with the rectilinear track secured transversely to the drafting-board, of the wheeled carriage mounted thereon and adapted to traverse the track, gripping its sides, and the rule pivotally connected to the carriage and provided upon its inner end with a scaled sector.

7. The combination, with the picture-plane-line track, the carriage thereon, and the rule pivotally connected thereto and provided with a scaled sector upon its inner end, of a scaled rule mounted upon said carriage at right angles thereto.

8. The combination, with the drafting-board provided on its under side with parallel pockets, of the near-vanishing-point rule pivotally mounted upon a holder removably inserted into one of said pockets.

GORDON ALMOND WRIGHT.

Witnesses:
L. A. SMITH,
E. D. SMITH.